(12) United States Patent
Ludeman

(10) Patent No.: US 7,492,826 B2
(45) Date of Patent: Feb. 17, 2009

(54) BIDIRECTIONAL BUFFERED INTERFACE FOR CROSSPOINT SWITCH

(75) Inventor: Christopher Ludeman, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 660 days.

(21) Appl. No.: 11/254,005

(22) Filed: Oct. 19, 2005

(65) Prior Publication Data

US 2006/0233264 A1 Oct. 19, 2006

Related U.S. Application Data

(60) Provisional application No. 60/671,719, filed on Apr. 15, 2005.

(51) Int. Cl.
*H04B 3/00* (2006.01)
*H04L 25/00* (2006.01)

(52) U.S. Cl. .................. 375/257; 375/219; 398/45; 376/268

(58) Field of Classification Search ................. 375/219, 375/257; 379/268; 398/45
See application file for complete search history.

(56) References Cited

U.S. PATENT DOCUMENTS 6,411,164 B1 6/2002 Enriquez .................... 330/257

OTHER PUBLICATIONS

Dallas Semiconductor MAXIM, Amplifier and Comparator Circuits, Interface Circuits, Video Circuits, Jul. 9, 1998, WTAs Provide Wideband, Bidirectional Drive For Coaxial Cable.

*Primary Examiner*—Curtis B Odom
(74) *Attorney, Agent, or Firm*—Fogg & Powers LLC

(57) ABSTRACT

A bidirectional crosspoint switch interface employs a pair of backward-connected transimpedance amplifiers of the type disclosed in the L. Enriquez U.S. Pat. No. 6,411,163, and associated scaling current mirrors that drive nodes of associated reverse signal cancellation circuits. The reverse signal cancellation circuits are coupled to respective pairs of ports of the crosspoint switch and input and output ports of 1:1 current mirrors, in a manner that affords bidirectional buffering between the crosspoint switch and a pair of bidirectional signaling ports that terminate respective signaling links, without signal reflections.

15 Claims, 3 Drawing Sheets

US 7,492,826 B2

BIDIRECTIONAL BUFFERED INTERFACE FOR CROSSPOINT SWITCH

CROSS-REFERENCE TO RELATED APPLICATION

The present application claims the benefit of U.S. Application, Ser. No. 60/671,719, filed Apr. 15, 2005, by Christopher Ludeman, entitled: "Bidirectional Buffered Interface for Crosspoint Switch," assigned to the assignee of the present application and the disclosure of which is incorporated herein.

FIELD OF THE INVENTION

The present invention relates in general to communication systems and subsystems and circuits thereof, and is particularly directed to a reduced hardware complexity-based bidirectional crosspoint switch interface, that employs a pair of reverse-configured transimpedance amplifiers and associated current mirrors, that provide bidirectional buffering between a crosspoint switch device and a pair of bidirectional input/output ports.

BACKGROUND OF THE INVENTION

FIG. 1 diagrammatically illustrates the overall system configuration of a conventional multiport crosspoint switch architecture of the type that may be used for video signal transmission networks and the like. As shown therein, a plurality N (e.g., eight in the illustrated example) of video inputs (derived from video sources not shown) are coupled via a plurality of input ports 10-1, ..., 10-8 to a set (e.g., eight) of input buffers 11. Input buffers 11 and an associated set (e.g., eight) of output buffers 17 are necessary, because the crosspoint switch to which respective pluralities of input and output ports are to be connected exhibit parasitic resistance and capacitance, which degrades the signal quality—hence the need for input/output buffering.

The N input buffers 11 have their respective outputs coupled to N input ports of an N×N (8×8 in the example) crosspoint switch matrix 13. Switch matrix 13 has a corresponding plurality of N outputs coupled to output drivers 15, that are coupled via (N=eight) output buffers 17, to an associated set (e.g., eight) of output ports 21-1, ..., 21-8. Each output port 21 is coupled by way of a prescribed impedance (e.g., a 75 ohm resistor 23), which matches the impedance of a driven line (e.g., a 75 ohm cable 25), which serves as a video output port 26 and is terminated by a (75 ohm) resistor 27 coupled to ground. Control of the interconnections through the switch matrix 13 is effected through a set of control lines of a multilink control cable 31, in accordance with signals (such as those supplied by input and output select lines, command lines, etc.) supplied by a supervisory switch control processor (not shown).

A fundamental shortcoming of the conventional multiport crosspoint switch architecture of FIG. 1 is the fact that it is unidirectional—providing signal transport only from input ports 10 to output ports 21. This implies that if the switch architecture is to be used for bidirectional signalling, the various ports must be designated in advance as to which pins are to be used for inputs and which pins are to be used for outputs. Moreover, when used for symmetrical bidirectional signalling, only half the input/output pins are available for each direction.

In addition to the conventional unidirectional crosspoint switch architecture of the type shown in FIG. 1, the prior art includes bidirectional transceiver arrangements, to which opposite ends of a bidirectional signal transport cable may be terminated, as diagrammatically illustrated in FIG. 2. In accordance with this arrangement, a relatively 'west' end 41 of a bidirectional signal transport cable 40 is terminated by a first dual port transceiver 50, while a relatively 'east' end 42 of the bidirectional signal transport cable 40 is terminated by a second dual port transceiver 60. By dual port transceiver is meant that the transceiver has both an input port and an output port, in addition to its connection with the bidirectional signal transport cable 40.

More particularly, considering the architecture and operation of the 'west' end dual port transceiver 50, for example, the transceiver is comprised of a first transconductance amplifier 70 and a second transconductance amplifier 80. An input port 101 is coupled to a non-inverting (+) input terminal 71 of the first amplifier 70 and to the inverting (−) input terminal 82 of the second amplifier 80. The inverting (−) input terminal 72 of the first amplifier 70 is coupled to a reference potential terminal 74 (e.g., ground), while the non-inverting (+) input terminal 81 of the second amplifier 80 is coupled in common with the output node 73 of the first amplifier 70, and terminates the 'west' end 41 of the cable 40. A termination resistor 43 is coupled to ground from the output node 73. The output node 83 of the second amplifier 80 serves as the output port 101 for the 'west' end dual port transceiver 50. The architecture of the 'east' end dual port transceiver 60 is configured in the same manner as the 'west' end dual port transceiver 50 and will not be described here. As shown, the 'east' end dual port transceiver 60 has an input port 111 and an output port 112.

In operation, when a signal is applied to the input port 102 of the 'west' end dual port transceiver 50, it is coupled to the non-inverting (+) input terminal 71 of the first amplifier 70 and to the inverting (−) input terminal 82 of the second amplifier 80. This signal appears at the output node 73 of the first amplifier for transport over the cable plant 40 to the 'east' end dual port transceiver to be delivered to output port 112 thereof. From the output node 73 of the first amplifier, the input signal is also applied to the non-inverting (+) input 81 of amplifier 80. Since the input signal is applied in antiphase to the two inputs 81 and 82 of amplifier 80, the input signal is effectively canceled by amplifier 80, so that it does not appear at output port 102. On the other hand, a signal received from the 'east' end dual port transceiver 60 will be coupled via the 'west' end 41 of the cable 40 to the non-inverting (+) input 81 of amplifier 80, so that it appears at its output node 83 and thereby the output port 102 of 'west' end dual port transceiver 50.

Now although the transceiver architecture of FIG. 2 provides an interface for bidirectional signaling, it is hardware intensive—requiring two transconductance amplifiers per transceiver—and requires a substantial signal drive, since driving the signal line also entails driving a termination impedance (e.g., 50 ohm resistor) to ground. It should also be noted that the transceiver architecture of FIG. 2 has been associated with the interfacing of signals with a bidirectional cable—not a crosspoint switch.

SUMMARY OF THE INVENTION

In accordance with the present invention, advantage is taken of the functionality of a reverse- or backward-connected transimpedance amplifier of the type disclosed in the L. Enriquez U.S. Pat. No. 6,411,163 (hereinafter referred to as the '163 patent and the disclosure of which is incorporated herein), to provide a reduced hardware complexity-based bidirectional crosspoint switch interface, that employs a pair of reverse-configured transimpedance amplifiers of the type disclosed in the '163 patent, and associated current mirrors, interconnected with associated signal cancellation circuits in a manner that affords bidirectional buffering between a crosspoint switch and a pair of bidirectional input/output ports, without signal reflections.

To this end, a signal transport cable, such as 75 ohm cable, is terminated by way of a (75 ohm) impedance to a relatively 'west' end, bidirectional signaling port of an output stage of a first, 'west' end transimpedance amplifier, of the type disclosed in the '163 patent, the bidirectional signaling port being coupled to the inverting (−) input terminal of a unity gain stage of the amplifier. The amplifier has its output stage coupled to an input terminal of a 'west' end K:1 current mirror, which divides the sensed line current by a factor of K, and reduces the current requirements of the interface.

The output of the 'west' end K:1 current mirror is coupled by way of a 'west' end reflected current cancellation, transhybrid unit to a first 'west' end port of a crosspoint switch, and to the output terminal of a 'west' end 1:1 current mirror. The 'west' end 1:1 current mirror is referenced to a voltage Vref (which may have a value midway between Vcc and ground), and has an input terminal coupled through a 2×75×K ohm resistor to the non-inverting (+) terminal of the unity gain stage of the 'west' end transimpedance amplifier, and to a second 'west' port of the crosspoint switch.

The 2×75×K ohm value of the resistor is selected to match the product of the current mirror scaling factor K, and the resistance seen at the 'west' end bidirectional signaling port 131, which corresponds to the sum of the resistances of the 'west' end cable plant and the line terminating resistor. As a result, the voltage developed across the 2×75×K ohm resistor, which voltage is applied to the non-inverting (+) terminal of the 'west' end transimpedance amplifier, corresponds to the product of a current sensed at an 'east' end terminal and scaled by a factor of K and the sum of an 'east' end terminating resistance and the characteristic impedance of a relatively 'east' end bidirectional signaling cable.

In a like manner, for coupling the relatively 'east' end bidirectional signaling cable to an 'east' end of the crosspoint switch, the bidirectional interface of the invention includes a 75 ohm impedance that terminates the 'east' cable. This terminating impedance is coupled to a relatively 'east' end bidirectional signaling port of an output stage of a second, 'east' end transimpedance amplifier which, like the 'west' end transimpedance amplifier at the west end of the interface, is of the type disclosed in the '163 patent. The 'east' end bidirectional signaling port is coupled to the inverting (−) input terminal of a unity gain stage of the 'east' end transimpedance amplifier, which has its output stage coupled to an input terminal of an 'east' end K:1 current mirror. The 'east' end K:1 current mirror has its output terminal coupled via an 'east' end reflected current cancellation, transhybrid unit to a first 'east' port of the crosspoint switch, and to the output terminal of an 'east' end 1:1 current mirror.

The 'east' end 1:1 current mirror, like the 'west' end 1:1 current mirror, is referenced to the voltage Vref. The 'east' end 1:1 current mirror has an input terminal coupled through a 2×75×K ohm resistor to the non-inverting (+) terminal of the 'east' end transimpedance amplifier's unity gain stage, and to a second 'east' port of the crosspoint switch. As in the case with the 'west' side of the interface, the 2×75×K ohm value of the resistor in the 'east' side of the interface matches the resistance seen at the 'east' end bidirectional signaling port corresponding to the product of the sum of the resistances of the 'east' cable and its terminating resistor, and the current scaling constant K of the 'west' end K:1 current mirror.

In operation, a signal applied from the 'west' end cable through its termination resistor to the 'west' end bidirectional signaling port of the 'west' end transimpedance amplifier is coupled to the inverting input of the 'west' end transimpedance amplifier's unity gain stage, so that a current is produced at its output stage and is fed therefrom to the input port of the 'west' end K:1 current mirror. In response to this input current, the 'west' end K:1 current mirror supplies a 1/Kth scaled current to the first west port of the crosspoint switch, the crosspoint switch thereby coupling the current to an 'east' port thereof.

This 1/Kth scaled current is supplied from the 'east' port of the crosspoint switch port through the 'west' end 2*K*75 ohm resistor, which develops a voltage that is applied to the non-inverting (+) terminal of the 'east' end transimpedance amplifier's unity gain stage, and is equal to the sensed 1/Kth scaled current times the sum of the line-terminating resistance and the characteristic impedance of the line times the scaling factor K. The output stage of the 'east' end transimpedance amplifier therefore drives the 'east' line with a voltage equal to the product of the current sensed by the 'west' end amplifier and the sum of the 'east' end termination resistance and the characteristic impedance of the 'east' end line. Thus, the signal applied to the 'west' end bidirectional signaling port from the 'west' end line is successfully regenerated at the 'east' end port bidirectional signaling port for application to the 'east' end line.

The current supplied through the 'west' end 2*K*75 ohm resistor is further supplied to the input port of the 'west' end 1:1 current mirror, which produces the same scaled current as supplied by the 'east' end K:1 current mirror. This scaled current is supplied to the current cancellation unit. As noted above, the current through 'west' end 2*K*75 ohm resistor develops a voltage which is applied to the non-inverting (+) input of the unity gain stage of the 'east' end transimpedance amplifier, so that the 'east' end amplifier's output stage generates a current corresponding to that produced by the output stage of the 'west' end's transimpedance amplifier. This output current is applied to the 'east' end K:1 current mirror, which produces a 1/Kth scaled value of the current. This scaled current is supplied to the 'west' end current cancellation unit in a sense opposite to that of the current supplied thereto from the 'east' end 1:1 current mirror, so that the two currents (one being produced by the 'east' end K:1 current mirror and the other being produced by the 'east' end 1:1 current mirror) effectively cancel each other.

Therefore, there is no reflection current supplied back into the first 'east' port of the crosspoint switch, and therefore no current output from the second 'west' crosspoint switch port applied to the 'west' end transimpedance amplifier. Namely, only the intended 'west' to 'east' input signal will successfully traverse the crosspoint switch and the interface circuitry that buffers the switch with the line. In the opposite ('east' to 'west' direction), a complementary operation takes place, so as to pass the desired signal from the 'east' cable plant to the 'west' cable plant without reflection, so that, in the 'east' to 'west' direction, only an 'east' to 'west' input signal will successfully traverse the crosspoint switch and the interface circuitry that buffers the switch with the line.

DETAILED DESCRIPTION

Architecture

Figure 1:
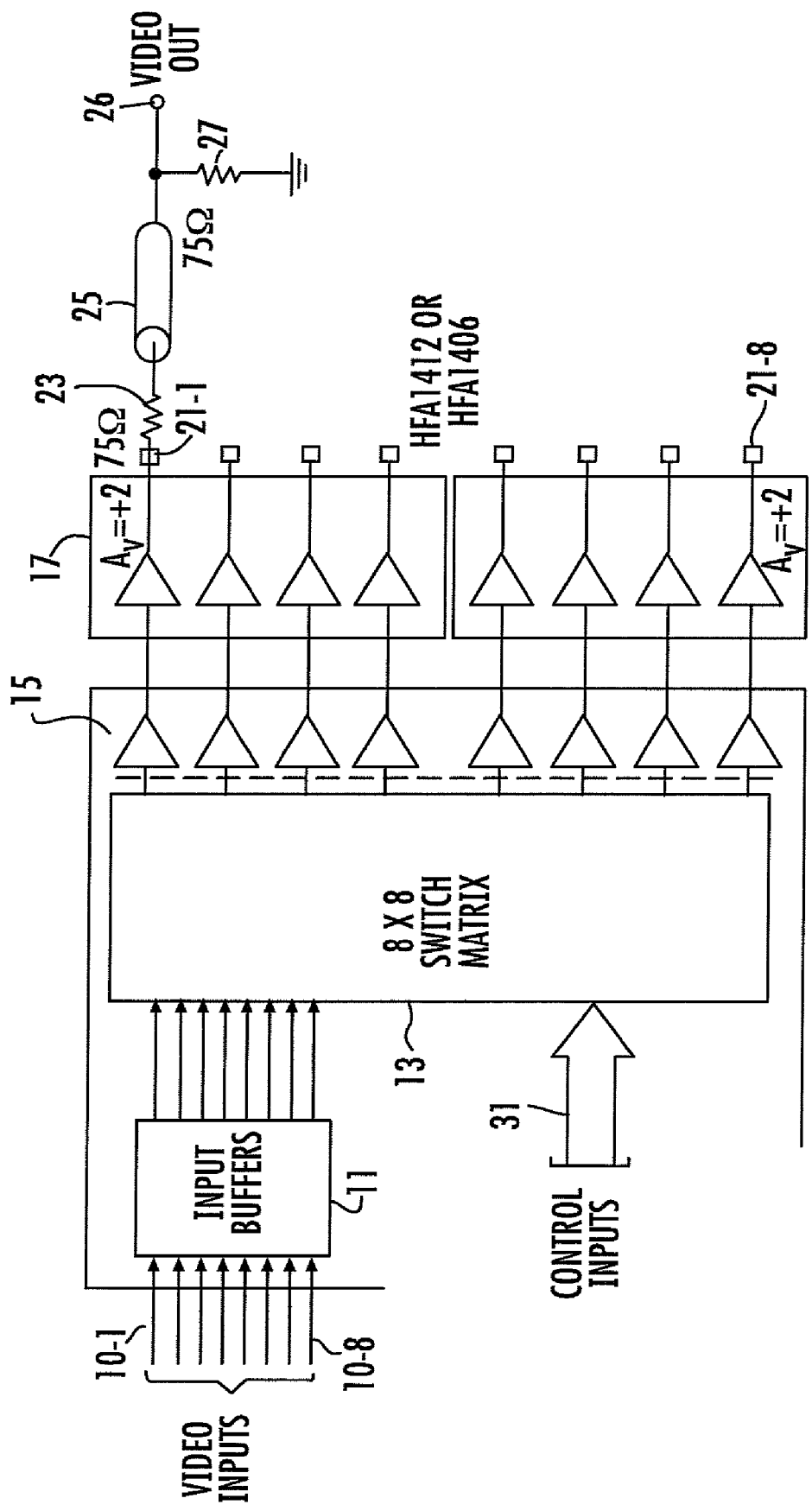
FIG. 1 diagrammatically illustrates the overall system configuration of a conventional multiport crosspoint switch architecture of the type that may be used for video signal transmission networks.
Figure 2:
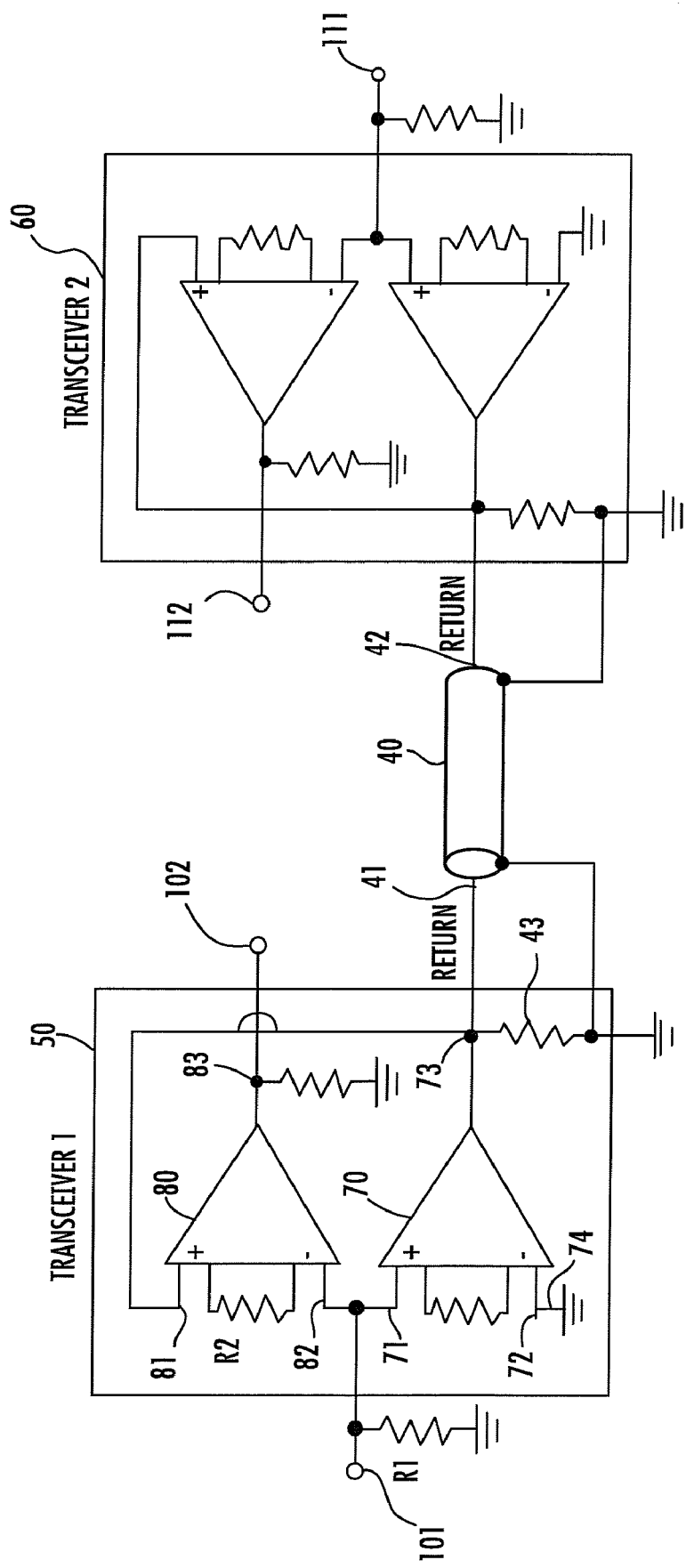
FIG. 2 diagrammatically illustrates a conventional bidirectional transceiver arrangement, to which opposite ends of a bidirectional signal transport cable may be terminated.

As pointed out briefly above, pursuant to the present invention, advantage is taken of the functionality of a reverse- or backward-connected transimpedance amplifier of the type disclosed in the '163 patent, to provide a reduced hardware complexity architecture for realizing full bidirectional signaling capability through a crosspoint switch. This new and improved bidirectional buffered interface architecture according to a preferred, but non-limiting, embodiment of the present invention is diagrammatically illustrated in FIG. 3, which shows a (75 ohm) cable 120 terminated by way of a (75 ohm) impedance 122 to a relatively 'west' end input/output (bidirectional signaling) port 131 of an output stage 133 of a first, 'west' end transimpedance amplifier 130, of the type disclosed in the '163 patent.

The input/output port 131 of 'west' end transimpedance amplifier 130 is coupled to the inverting (−) input terminal 132 of a unity gain stage 135 of the amplifier. The 'west' end transimpedance amplifier 130 has its output stage 133 coupled to an input terminal 141 of a K:1 current mirror 140, which is operative to produce a 1/Kth scaled output current at its output terminal 142, in response to a current supplied to its input terminal 141. By dividing the sensed line current at input terminal 141 by a factor of K, current mirror 140 serves to provide a relatively low output current at its output terminal 142, which reduces the current requirements of the interface.

The output terminal 142 of current mirror 140 is coupled by way of a node 171 of a reflected current cancellation, transhybrid unit 170 to a first ('west') input/output port 151 of a bidirectional crosspoint switch 150, and to the output terminal 162 of a 1:1 current mirror 160. 1:1 current mirror 160 is referenced to a voltage Vref (which may have a value between the values of the power supply rails of the circuit, e.g., midway between Vcc and ground), and has an input terminal 161 coupled through a 2×75×K ohm resistor 165 to the non-inverting (+) terminal 134 of the unity gain stage 135 of 'west' end transimpedance amplifier 130, and to a second ('west') input/output port 152 of crosspoint switch 150.

The value of resistor 165 is selected to match the product of the current mirror scaling factor K, and the resistance seen at the input/output port 131 (corresponding to the sum of the resistances of the cable 120 and the terminating resistor 122). As a result, as will be described below, resistor 165 produces a voltage thereacross, which is applied to the non-inverting (+) terminal 134 of amplifier 130, that corresponds to the product of the current sensed at the 'east' end terminal 231 and scaled by a factor of K and the sum of the terminating resistance 222 and the characteristic impedance of a bidirectional signaling cable 220.

Figure 3:
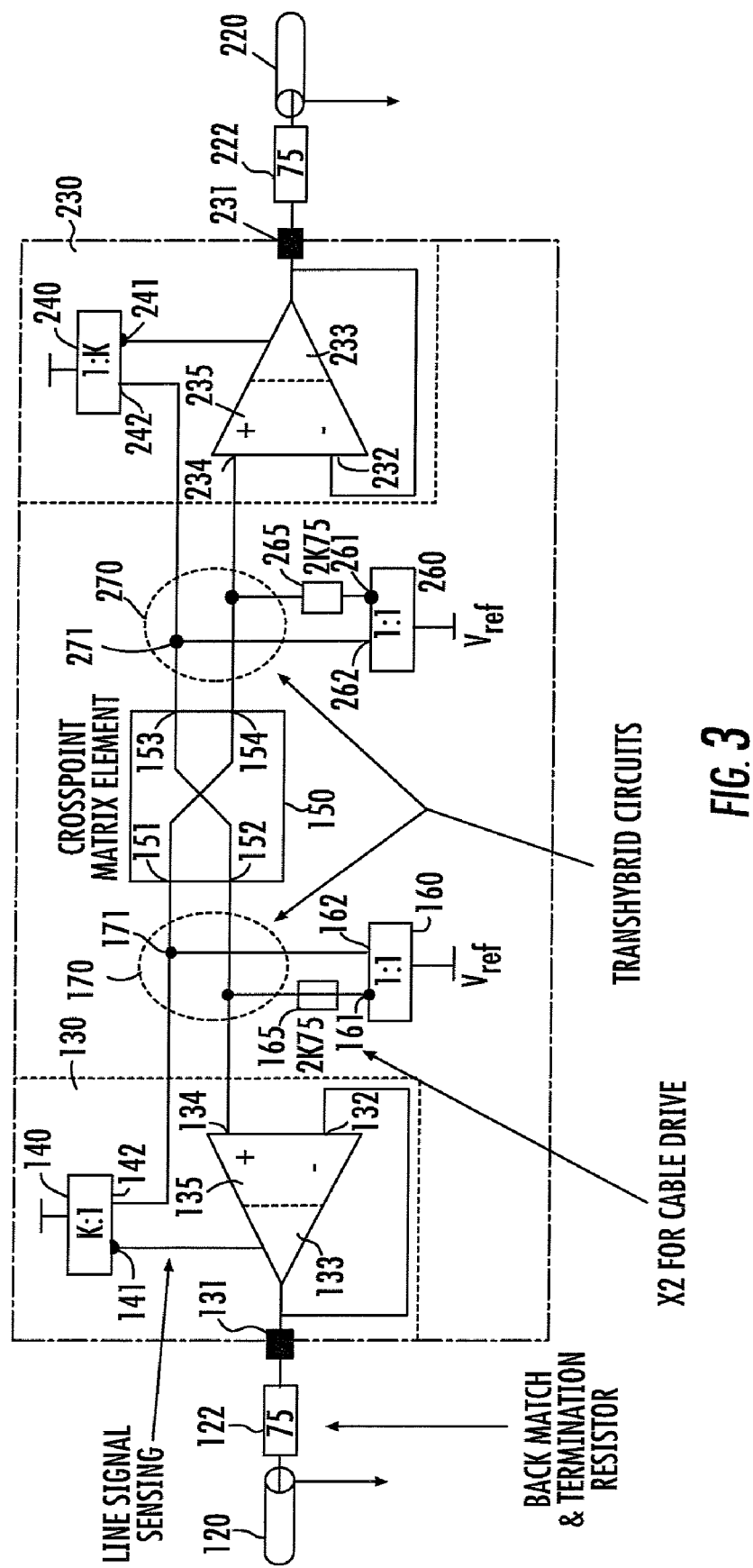
FIG. 3 diagrammatically illustrates a bidirectional interface in accordance with an embodiment of the present invention, which employs a pair of backward-connected transimpedance amplifiers of the type disclosed in the '163 patent, for realizing full bidirectional signaling capability through a crosspoint switch.

In a like manner, for coupling a relatively 'east' end of the bidirectional signaling cable 220 to an 'east' end of the crosspoint switch 150, the architecture of FIG. 3 includes a (75 ohm) impedance 222 that terminates the cable 220. Terminating impedance 222 is coupled to a relatively 'east' end input/output (bidirectional signaling) port 231 of an output stage 233 of a second, 'east' end transimpedance amplifier 230 which, like the first, 'west' end transimpedance amplifier 130 at the west end of the interface, is of the type disclosed in the '163 patent. The 'east' end input/output port 231 is coupled to the inverting (−) input terminal 232 of a unity gain stage 235 of 'east' end transimpedance amplifier 230. A transimpedance amplifier output stage 233 is coupled to an input terminal 241 of a K:1 current mirror 240, which has its output terminal 242 coupled via a node 271 of a reflected current cancellation, transhybrid unit 270 to a third ('east') input/output port 153 of crosspoint switch 150, and to the output terminal 262 of a 1:1 current mirror 260.

Current mirror 260, like current mirror 160, is referenced to the voltage Vref which, as noted above, may have a value midway between Vcc and ground. Current mirror 260 has an input terminal 261 coupled through a 2×75×K ohm resistor 265 to the non-inverting (+) terminal 234 of the 'east' end transimpedance amplifier's unity gain stage 235, and to a fourth ('east') input/output port 154 of crosspoint switch 150. As in the case with the 'west' side of the interface, the value of resistor 265 in the 'east' side of the interface is selected to match the resistance seen at the input/output port 231 corresponding to the product of the sum of the resistances of the cable 220 and the terminating resistor 222, and the current scaling constant K of the current mirror 240.

Operation

The bidirectional buffered interface of FIG. 3 operates as follows. Consider, first, a signal that is transported by way of the 'west' end cable 120 and is applied through termination resistor 122 to the 'west' end input/output port 131 of the 'west' end transimpedance amplifier 130. In response to this signal being applied to the inverting input 132 of the transimpedance amplifier's unity gain stage 135, a current is produced at its output stage 133, and is fed therefrom to the input port 141 of K:1 current mirror 140. In response to this input current, the output port 142 of K:1 current mirror 140 supplies a 1/Kth scaled current to port 151 of crosspoint switch 150. In the illustrated example, crosspoint switch port 151 is coupled to port 154, and crosspoint switch port 152 is coupled to port 153.

As a consequence, the 1/Kth scaled current is supplied from crosspoint switch port 154 through resistor 265, which develops a voltage thereacross, which is applied to the non-inverting (+) terminal 234 of the 'east' end transimpedance amplifier's unity gain stage 235, equal to the sensed 1/Kth scaled current times the sum of the line-terminating resistance and the characteristic impedance of the line times the scaling factor K. The output stage 233 of the 'east' end transimpedance amplifier 230 therefore drives the 'east' line 220 with a voltage equal to the product of the current sensed by the 'west' end amplifier 130 and the sum of the termination resistance 222 and the characteristic impedance of the line 220, so that the signal applied to the 'west' end port 131 from cable plant 120 is regenerated at the 'east' end port 231 for application to the cable plant 220. Namely, the input signal applied to the 'west' end port 131 has successfully traversed the crosspoint switch and the interface circuitry that buffers the switch with the line 220.

The current supplied through resistor 265 is further supplied to the input port 261 of 1:1 current mirror 260, the output port 262 of which produces the same scaled current as supplied by the output port 142 of current mirror 140. This scaled current is supplied to the node 271 within current cancellation unit 270. As noted above, the current through resistor 265 also develops a voltage thereacross, which is applied to the non-inverting (+) input 234 of the unity gain stage 235 of transimpedance amplifier 230, so that the 'east' end amplifier's output stage generates a current corresponding to that produced by the output stage 133 of the 'west' end's transimpedance amplifier 130.

This output current is applied to the input terminal 241 of current mirror 240, the output 242 of which produces a 1/Kth scaled value of the current. This scaled current is supplied to node 271 of current cancellation unit 270 in a sense opposite to that of the current supplied thereto from current mirror 260, so that the two currents (one being produced by 1:K current mirror 240 and the other being produced by 1:1 current mirror 260) effectively cancel each other at node 271. Therefore, there is no reflection current supplied back into port 153 of crosspoint switch 150, and therefore no current output from crosspoint switch port 152 applied to transimpedance amplifier 130. Namely, only the intended 'west' to 'east' input signal will successfully traverse the crosspoint switch and the interface circuitry that buffers the switch with the line.

In the opposite ('east' to 'west' direction), a complementary operation takes place, so as to pass the desired signal from the 'east' cable plant 220 to the 'west' cable plant without reflection. To this end, a signal transported by way of the 'east' end cable 220, and applied through termination resistor 222 to the 'east' end input/output port 231 of 'east' end transimpedance amplifier 230, is coupled to the inverting input 232 of the transimpedance amplifier's unity gain stage 235, so that a current is produced at its output stage 233, and fed to input port 241 of current mirror 240. In response to this input current, the output port 242 of current mirror 240 supplies a 1/Kth scaled current to port 153 of crosspoint switch 150.

As described above, in the illustrated example, crosspoint switch port 153 is coupled to port 152. As a consequence, the scaled current is supplied from crosspoint switch port 152 through resistor 165, which develops a voltage thereacross equal to the sensed current times the sum of the line-terminating resistance and the characteristic impedance of the line times the scaling factor K. The 'west' end transimpedance amplifier's output stage 133 therefore drives the 'west' line 120 with a voltage equal to the product of the current sensed by the 'west' end amplifier 130 and the sum of the termination resistance 122 and the characteristic impedance of the line 120. Namely, the signal applied to the 'east' end port 231 from cable plant 220 is regenerated at the 'west' end port 131 for application to the cable plant 120, as desired. Thus, the input signal applied to the 'east' end port 231 has successfully traversed the crosspoint switch and the interface circuitry that buffers the switch with the line 120.

The current supplied through resistor 165 is further supplied to the input port 161 of 1:1 current mirror 160, the output port 162 of which produces the same scaled current as supplied by the output port 242 of current mirror 240. This scaled current is supplied to the node 171 within current cancellation unit 170. As noted above, the current through resistor 165 also develops a voltage thereacross, which is applied to the non-inverting (+) input 134 of the unity gain stage 135 of 'west' end transimpedance amplifier 130, so that the 'west' end amplifier's output stage 133 generates a current corresponding to that produced by the output stage 233 of the 'east' end's transimpedance amplifier 230.

This output current is applied to the input terminal 141 of current mirror 140, the output 142 of which produces a 1/Kth scaled value of the current. This scaled current is supplied to node 171 of current cancellation unit 170 in a sense opposite to that of the current supplied thereto from current mirror 160, so that the two currents (one being produced by 1:K current mirror 140 and the other being produced by 1:1 current mirror 160) effectively cancel each other at node 171. Therefore, there is no reflection current returned back into port 151 of crosspoint switch 150, and therefore no current output from crosspoint switch port 154 applied to transimpedance amplifier 230. Thus, in the 'east' to 'west' direction, only an 'east' to 'west' input signal will successfully traverse the crosspoint switch and the interface circuitry that buffers the switch with the line.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A bidirectional interface for a bidirectional crosspoint switch comprising a pair of reverse-configured transimpedance amplifiers, having input/output ports thereof coupled to bidirectional signaling ports that are adapted to be coupled to respective communication lines, and having current mirror outputs thereof interconnected to ports of said bidirectional crosspoint switch via associated signal cancellation circuits, providing bidirectional buffering between said bidirectional crosspoint switch and said bidirectional signaling ports without signal reflections.

2. The bidirectional interface according to claim 1, wherein said crosspoint switch comprises a four-port crosspoint switch, having a first pair of ports coupled to a first of said pair of reverse-configured transimpedance amplifiers through a first, transhybrid signal cancellation circuit, and having a second pair of ports coupled to a second of said pair of reverse-configured transimpedance amplifiers through a second, transhybrid signal cancellation circuit.

3. The bidirectional interface according to claim 2, wherein said first and second, transhybrid signal cancellation circuits include current nodes that are coupled to inputs and outputs of respective first and second current mirrors.

4. The bidirectional interface according to claim 3, wherein
said first, transhybrid signal cancellation circuit has a first current node thereof coupled through a first resistor to an input of said first current mirror, and coupled to a first of said first pair of ports of said four-port crosspoint switch, and a second current node thereof coupled to an output of said first current mirror, and coupled to a second of said first pair of ports of said four-port crosspoint switch; and wherein
said second, transhybrid signal cancellation circuit has a first current node thereof coupled through a second resistor to an input of said second current mirror, and coupled to a first of said second pair of ports of said four-port crosspoint switch, and a second current node coupled to an output of said second current mirror, and coupled to a second of said second pair of ports of said four-port crosspoint switch.

5. The bidirectional interface according to claim 4, wherein said first and second current mirrors are 1:1 current mirrors, and wherein said first and second resistors have values defined in accordance with values of line termination impedances through which said bidirectional signaling ports are adapted to be coupled to said respective communication lines, and scaling factors of current mirror outputs of said reverse-configured transimpedance amplifiers.

6. A bidirectional interface for a bidirectional crosspoint switch comprising:
first and second transimpedance amplifier circuits, each of which includes
an operational amplifier having first and second input nodes, and an output node, said operational amplifier having a gain stage cascaded with an output stage, said gain stage having an inverting input coupled to said first input node, and a non-inverting input coupled to said second input node, said output stage having an output thereof coupled to said output node, said output of said output stage being coupled by way of a feedback path to said inverting input of said gain stage, and a first current mirror coupled to a first voltage supply, and having a first current mirror input port coupled to said output stage, and a first current mirror output port coupled to an output port of a second current mirror, said second current mirror having an input port coupled through a scaling impedance to said non-inverting input of said operational amplifier;

a bidirectional crosspoint switch having first, second, third and fourth ports, and being adapted to interconnect said first and second ports thereof with said third and fourth ports thereof; and wherein said first port of said crosspoint switch is coupled to said output port of said first current mirror of said first transimpedance amplifier circuit, said second port of said crosspoint switch is coupled to said non-inverting input of said operational amplifier of said first transimpedance amplifier circuit, said third port of said crosspoint switch is coupled to said output port of said first current mirror of said second transimpedance amplifier circuit, said fourth port of said crosspoint switch is coupled to said non-inverting input of said operational amplifier of said second transimpedance amplifier circuit, a first bidirectional signaling port coupled to the output node of said first transimpedance amplifier circuit; and a second bidirectional signaling port coupled to the output node of said second transimpedance amplifier circuit.

7. The bidirectional interface according to claim 6, wherein the second current mirror of said first transimpedance amplifier circuit has an output port thereof coupled to said first port of said crosspoint switch, and wherein the second current mirror of said second transimpedance amplifier circuit has an output port thereof coupled to said third port of said crosspoint switch.

8. The bidirectional interface according to claim 7, wherein the second current mirror of said first transimpedance amplifier circuit has an input port thereof coupled through a first scaling impedance to said second port of said crosspoint switch, and wherein the second current mirror of said second transimpedance amplifier circuit has an input port thereof coupled through a second scaling impedance to said fourth port of said crosspoint switch.

9. The bidirectional interface according to claim 8, wherein said first current mirror comprises a K:1 current mirror, and wherein said second current mirror comprises a 1:1 current mirror.

10. The bidirectional interface according to claim 9, wherein each of said first and second scaling impedances has a value defined in accordance with a value of a line termination impedance through which a respective bidirectional signaling port is adapted to be coupled to a respective communication line, and a K:1 scaling factor of said first current mirror.

11. A bidirectional interface for providing bidirectional connectivity between a first bidirectional signaling port that is adapted to be coupled to a first bidirectional signaling link, and a second bidirectional signaling port that is adapted to be coupled to a second bidirectional signaling link, said interface comprising:

a four-port bidirectional crosspoint switch, having a first pair of ports thereof cross-coupled to a second pair of ports thereof;

a first buffer stage that includes a first, reverse-configured transimpedance amplifier circuit, having an input/output port coupled to said first bidirectional signaling port, an output stage coupled to a first scaling current mirror, which has an output thereof coupled to a first port of said first pair of ports of said four-port bidirectional crosspoint switch, and an input stage coupled to a second port of said first pair of ports of said four-port bidirectional crosspoint switch, and a first reflected signal cancellation stage coupled to said first and second ports of said first pair of ports of said four-port bidirectional crosspoint switch; and a second buffer stage that includes a second, reverse-configured transimpedance amplifier circuit, having an input/output port coupled to said second bidirectional signaling port, an output stage coupled to a second scaling current mirror, which has an output thereof coupled to a first port of said second pair of ports of said four-port bidirectional crosspoint switch, and an input stage coupled to a second port of said second pair of ports of said four-port bidirectional crosspoint switch, and a second reflected signal cancellation stage coupled to said first and second ports of said second pair of ports of said four-port bidirectional crosspoint switch.

12. The bidirectional interface according to claim 11, wherein said first and second signal cancellation stages include current nodes that are coupled to inputs and outputs of respective first and second 1:1 current mirrors.

13. The bidirectional interface according to claim 12, wherein said first signal cancellation stage has a first current node coupled through a first scaling resistor to an input of said first 1:1 current mirror, and coupled to said second port of said first pair of ports of said four-port crosspoint switch, and a second current node thereof coupled to an output of said first 1:1 current mirror, and coupled to said first port of said first pair of ports of said four-port crosspoint switch; and wherein said second signal cancellation stage has a first-current node thereof coupled through a second scaling resistor to an input of said second 1:1 current mirror, and coupled to said second port of said second pair of ports of said four-port crosspoint switch, and a second current node coupled to an output of said second 1:1 current mirror, and coupled to said first port of said second pair of ports of said four-port crosspoint switch.

14. The bidirectional interface according to claim 13, wherein said first and second scaling resistors have values defined in accordance with values of line termination impedances through which said bidirectional signaling ports are adapted to be coupled to said respective bidirectional signaling links, and scaling factors of said first and second current mirrors of said first and second reverse-configured transimpedance amplifiers.

15. The bidirectional interface according to claim 14, wherein said first and second current mirrors are K:1 current mirrors.

* * * * *